United States Patent
Nonaka et al.

(10) Patent No.: US 8,743,496 B2
(45) Date of Patent: *Jun. 3, 2014

(54) SERVO PATTERN COMPATIBLE WITH PLANARIZATION CONSTRAINTS OF PATTERNED MEDIA AND USE OF A SINGLE MASTER TEMPLATE

(75) Inventors: Keiichiro Nonaka, Fujisawa (JP); Kei Yasuna, Fujisawa (JP); Masahito Kobayashi, Ushiku (JP)

(73) Assignee: HGST Netherlands B.V., Amsterdam (NL)

( * ) Notice: Subject to any disclaimer, the term of this patent is extended or adjusted under 35 U.S.C. 154(b) by 271 days.

This patent is subject to a terminal disclaimer.

(21) Appl. No.: 13/176,956

(22) Filed: Jul. 6, 2011

(65) Prior Publication Data

US 2013/0010384 A1    Jan. 10, 2013

(51) Int. Cl.
G11B 5/02    (2006.01)
(52) U.S. Cl.
USPC ............. 360/55; 360/49; 360/51; 360/77.01; 360/77.08
(58) Field of Classification Search
None
See application file for complete search history.

(56) References Cited

U.S. PATENT DOCUMENTS

| | | |
|---|---|---|
| 6,490,111 B1 | 12/2002 | Sacks |
| 6,643,082 B1 | 11/2003 | Belser |
| 7,466,506 B1 | 12/2008 | Albrecht et al. |
| 7,652,839 B2 | 1/2010 | Albrecht et al. |
| 7,706,092 B2 | 4/2010 | Ling et al. |
| 2006/0279871 A1 | 12/2006 | Albrecht et al. |
| 2011/0188149 A1 | 8/2011 | Albrecht et al. |
| 2013/0010384 A1 | 1/2013 | Nonaka et al. |

OTHER PUBLICATIONS

Lin et al, "Investigation of advanced position error signal patterns in patterned media," Journal of Applied Physics, vol. 87, No. 9, May 1, 2000, © 2000 American Institute of Physics.

*Primary Examiner* — Muhammad N Edun
(74) *Attorney, Agent, or Firm* — Duft Bornsen & Fettig LLP

(57) ABSTRACT

Embodiments described herein provide for robust servo patterns that comply with planarization constraints and also allow use of a single master template for manufacture of both the front and back of a magnetic disk. Planarization constraints are met because only a portion of servo data is hard patterned on the magnetic disk and the hard patterned servo data areas comply with planarization constraints. The servo pattern has two symmetrical servo write assist patterns, one on each side of a central burst pattern. The servo sync, SAM, track-ID, sector-ID, and/or RRO values can be written magnetically by the write head onto these servo write assist patterns after the completion of the planarization process. The symmetric design of the servo pattern allows both a left-to-right and a right-to-left servo write and read back, thereby enabling use of a single master template in magnetic disk manufacture.

31 Claims, 8 Drawing Sheets

SERVO PATTERN COMPATIBLE WITH PLANARIZATION CONSTRAINTS OF PATTERNED MEDIA AND USE OF A SINGLE MASTER TEMPLATE

FIELD OF THE INVENTION

The invention relates to the field of disk drive systems and, in particular, to servo patterns imprinted on a patterned magnetic disk to align a slider with data on the magnetic disk.

BACKGROUND

Many computing systems use disk drive system systems for mass storage of information. Magnetic disk drives typically include one or more sliders that include a read head and a write head. An actuator/suspension arm holds the slider above a magnetic disk. The magnetic disk includes data regions and servo sectors. A voice coil motor ("VCM") moves the actuator/suspension arm to position the slider over selected magnetically written data with the feedback of servo data. Electronics on the disk drive system include a write driver, a read signal preamplifier, a read-write channel, a controller, and firmware. The controller typically is an assortment of circuit chips connected on a printed circuit board. The controller includes one or more microprocessors, memory, servo control circuits, hard disk control circuits, spindle motor drivers, and VCM drivers. The read-write channel can include analog to digital conversion circuits, data clocks, servo clocks, and phase locked loops.

Both the data regions and servo sectors can include information that is magnetically written by the write head onto the magnetic disk and also read back by the read head from the magnetic disk. The data regions include data tracks that are available to store end-user files and disk drive system parameter data (or maintenance data). The data is written typically in 512 byte or 4 kilobyte data blocks. Each data block usually has a data sync field, the actual data (typically encoded and possibly encrypted), and error correction data. The end-user is free to store new data and later modify the data.

The servo sectors include servo data that is used to position the slider. Servo data is typically only written at the manufacturing facility and cannot be changed by the end-user. There are various techniques for writing servo data on a magnetic disk; in a typical method called self-servo writing the servo data is step-wise propagated from the inner diameter to the outer diameter using the write head to write servo data that is later used for servo track following to assist the writing of additional servo data. One complicating factor for self-servo writing (as well as normal data writing) is the radial read-write offset distance ("RWO") between the write head and the read head. The RWO changes with the slider's angular position over the magnetic disk based on the location of the read head and write head on the slider and the arc made by the actuator over the magnetic disk. Often in self-servo writing, the read head is offset toward the inner diameter from the write head and the servo data is written from the inner diameter to the outer diameter.

Servo data may include a synchronization field (servo sync), a sector address mark ("SAM"), sector-ID, track-ID (sometimes called the cylinder-ID), a servo burst, a repeatable runout (RRO) value, and a pad. Data tracks are usually identified by a combination of the track-ID, servo burst, and/or RRO value.

The servo sync is typically the first servo data read by the read head as it passes through a servo sector. The servo sync can be used by the read-write channel to establish servo frequency and servo clock phase. Portions of the servo sync can also be used for automatic gain control in the disk drive system electronics. The servo sync can be written with either a single magnetic polarity or with an alternating polarity as demonstrated in U.S. Patent Application Pub. No. 2006/0279871A1. The servo sync is sometimes referred to as a preamble.

The servo frequency in conventional disk drive systems is constant from the inner diameter to the outer diameter. As a result of this constant frequency, the servo sectors increase in circumferential length proportional to radial location. For instance, the circumferential length of the servo sector at the outer diameter may be about twice the length of the servo sector at the inner diameter.

If a zoned servo architecture is employed, the servo frequency increases from between servo zones from the inner diameter to the outer diameter. The servo frequency changes between the zones roughly with the mean radius of each servo zone. The servo frequency within each zone usually remains constant. Because the servo sector is broken into shorter radial servo zones, the circumferential length of the servo sectors does not vary as much as in the conventional servo design. The reduced variance in circumferential length when using zoned servo provides an advantage when using patterned media as the servo patterns for zoned servo can be more uniform in circumferential length from the inner diameter to the outer diameter. See U.S. patent application Ser. No. 12/699,581 ("the '581") and the description below of Dry Planarization Design Rules #1 and #2.

Examples of zoned servo can be found in U.S. Pat. No. 6,178,056 FIGS. 2B and 2C; U.S. Pat. No. 7,012,773 FIGS. 10, 15, 20, 28 and column 11 ("the '773"); and U.S. Pat. No. 7,715,138 FIG. 2A. The '773 FIG. 10 demonstrates a design with a series of concentric zones making up an alternating series of normal servo zones that are single frequency ("servo zones") and overlap zones that are dual frequency ("dual frequency zones"). In the dual frequency zones, half of the servo sectors use a first servo frequency that is the same as the bordering lower frequency servo zone while the remaining servo sectors use a second servo frequency that is the same as the bordering higher frequency servo zone. In the '773 FIG. 10 design, the servo zones and dual frequency zones are arranged in continuous radial servo sectors. FIGS. 15, 20, and 25 of the '773 demonstrate other possible zoned servo arrangements in which the servo sectors are not radially continuous.

The SAM (also called a servo address mark, start of servo mark, and servo sync byte) acts as a starting point from which to locate other servo data. For instance, the track-ID, sector-ID, and servo burst can be positioned a predefined distance from the SAM in a predefined order. The SAM is typically a unique magnetic shape so that it is more easily distinguishable by the disk drive system electronics from other magnetic information written on the magnetic disk. The SAM may not follow the same rules or constraints as other data that is written on the magnetic disk. For instance, the SAM may be written at a different frequency or otherwise differ in width and/or spacing from the other servo data.

The sector-ID is used to identify the particular servo sector as the slider circles a track. A track may have 250 or more sequential servo sectors. The sector-ID provides the controller with the circumferential position of the slider. The sector-ID is typically substantially identical in each track of an individual servo sector as it propagates radially from inner diameter to outer diameter. The sector-ID may be a unique digital number identifying the specific servo sector, such as a sector-ID between one and 250 if there are 250 servo sectors in one track. The sector-ID may be split between several servo sectors to reduce the circumferential length of each servo sector; in this case, several servo sectors need to be read to determine the complete sector-ID. In some designs, the magnetic disk has a start of track mark and the controller includes a counter; in this case, a start of track mark resets the counter and the counter is incremented each time new a SAM is encountered by the read head to provide a running count for the complete sector-ID. In this specification, the term sector-ID is meant to include each of these possible designs.

The track-IDs are used to identify the particular radial position as the slider moves radially from the inner diameter to outer diameter. The track-ID is often written in a gray code digital format; there are many gray code formats and some formats encrypt the track-ID and/or provide error-correction redundancy. The track-ID can also be written using a plurality of phase patterns (e.g., chevron patterns), as demonstrated in FIGS. 4A, 4B, 8, and 10 of U.S. patent application Ser. No. 12/634,240 ("the '240"). The track-ID provides the controller with the radial position of the slider. The track-IDs can ascend in numerical value within a specific servo sector from inner diameter to outer diameter; the track-ID can be substantially identical within the sequential servo sectors of a specific track. The track-ID may be a unique digital number identifying the specific radial position, such as a number between one and 100,000 if there are 100,000 unique gray code numbers in the servo sector from the inner diameter to the outer diameter. There is usually not a one to one correspondence between magnetically written data tracks and gray code track-IDs. The track-ID may also be split between several servo sectors to reduce the circumferential length of the track-ID in each servo sector; in this case, several servo sectors need to be read to determine the complete track-ID. In this specification, the term track-ID is meant to include each of these possible designs.

Servo bursts are used to center the slider on the magnetically written data tracks. The servo bursts are used to create a position error signal used by the controller to make fine adjustments to the slider position and center it over a track. The servo burst can be: (i) an ABCD servo burst as demonstrated in U.S. Pat. No. 6,490,111 FIG. 4; (ii) a checkerboard servo burst as demonstrated in U.S. Pat. No. 6,643,082 FIG. 10 and U.S. Pat. No. 7,706,092 FIGS. 6 and 7; or (iii) a phase servo burst as demonstrated in the '581 FIG. 9 item 804. The '581 is incorporated herein by reference. The servo burst can be written with either a single magnetic polarity or with an alternating polarity as demonstrated in the '871. The read back signal of a servo burst will show a repeating series of isolated pulses generated from each magnetic transition. Checkerboard servo bursts with alternating polarity are often called DC-free null servo burst. Unlike the ABCD servo burst and checkerboard servo bursts, the phase servo bursts are configured with a slope. There is often not a one to one correspondence between the radial dimensions of track-IDs and the servo burst. The signal magnitude of a servo burst read back is typically used by the disk drive system electronics to identify a fraction of track-ID's width. Data tracks are usually identified by a combination of the servo data taken from a read back of the track-ID, servo burst strength, and/or RRO value. There is often not a one to one correspondence between the radial dimensions of a servo burst and a data track.

RRO (or repeatable runout) values are determined usually during manufacturing and stored within the disk drive system for use during operation. If the RRO values are stored within the servo sectors, they are often stored as bits of information located after the servo burst.

Often there is pad before and/or after the servo data. The pad does not necessarily include any specific data. The pad is used to accommodate read-to-write and write-to-read transition timing of the write driver, read signal preamplifier, and read-write channel.

Patterned magnetic disk designs have emerged recently to enhance the recording density by providing better track and/or bit isolation. For example, nano scale non-magnetic grooves may be patterned on the magnetic disk by removing magnetic material and leaving behind discrete tracks or bit "islands" of magnetic material. There are two common forms of patterned magnetic disk: Discrete Track Media ("DTM") and Bit Patterned Media ("BPM"). In DTM, discrete tracks are patterned into the magnetic disk and data bits are magnetically written thereto. In BPM, individual bits may be patterned via track grooves and crossing bit grooves, creating islands of magnetic material. Both BPM and DTM establish data patterns where data may be magnetically written. Read back of pattern media will show magnetic transitions between the magnetized magnetic islands and non-magnetic grooves, such as in BPM; read back of pattern media will also show magnetic transitions occurring within a single magnetic island, such as in DTM. (Note that, unlike DTM or BPM, conventional non-patterned media has layers of magnetic material sputtered onto the entire front and back surfaces of the magnetic disk and there are typically no pre-formatted patterns).

In both BPM and DTM the disk patterning process can be used to create unique magnetic islands in the shape of various portions of the servo data. In U.S. Pat. No. 6,490,111 ("the '111") FIG. 4, for example, the pattern imprint includes magnetic islands in the shape of all the intended final servo data, including the gray code track-ID. With the '111 design, the servo data is readable by the read head after bulk Direct Current ("DC") magnetization (e.g., single magnetic polarity) of the magnetic islands because of the read back signal contrast between the presence and absence of magnetic material. The problem with this servo data writing approach, however, is that many of the available planarization constraints have difficulty dealing with the widely varying sizes and shapes of the gray code track-ID formats and sector-ID formats. Certain planarization constraints impose design rules on patterned magnetic disk. For liquid-based planarization, all non-magnetic grooves should be configured at or below a specified width that allows for the liquid to planarize the grooves through capillary forces. For dry planarization, such as vacuum deposit/etchback planarization, the ratio of magnetic island widths to non-magnetic groove widths needs to be constant everywhere ("Dry Planarization Design Rule #1"). It is also advantageous to ensure that magnetic island and non-magnetic groove widths are constant everywhere ("Dry Planarization Design Rule #2"). Servo patterns that comply with these planarization constraints are sometimes called planarization compatible servo ("PCS") or planarization-compatible servo pattern ("PSP").

An alternative approach to bulk DC magnetization of pre-patterned gray code track-ID, is to hard pattern only a portion of the servo data on the magnetic disk and fill in the remaining servo data by magnetically writing with the write head the desired servo data into the remaining portions of the servo pattern. This process has been called assisted servo track write for patterned media. In the '581, for instance, the servo pattern includes a single servo write assist pattern and a plurality of checkerboard sub-patterns. The servo write assist pattern is comprised of radial magnetic islands and radial non-magnetic grooves. The servo write assist pattern can also, as demonstrated in FIG. 6 of the '111, be comprised of circumferential magnetic rows and circumferential non-magnetic grooves. After assembly of the patterned magnetic disk into a disk drive system, the write head is used to magnetically write the track-ID in the servo write assist patterns. The writing of the track-ID by the write head does not change the shape of the magnetic islands and non-magnetic grooves of the servo write assist patterns.

A hybrid servo writing approach is to combine of small number of bootstrap patterns (which are operable after DC magnetization) and predominant servo write assist patterns (which require magnetic writing by the write head). The bootstrap patterns may include pre-patterned SAM patterns, gray code track-ID patterns, sector-ID patterns, and burst patterns that do not comply with the planarization constraints. The bootstrap patterns may be designed to comply with planarization constraints by using phase patterns (e.g., chevrons), such as shown in FIGS. 4A, 4B, 8, and 10 of the '240. With either pre-patterned gray code or phase patterns, the bootstrap patterns are operational after bulk DC magnetization of the magnetic disk. The bootstrap patterns are typically located at the inner diameter and used for track following during the servo track writing of an initial set of servo write assist patterns by the write head. After the initial set of servo write assist patterns have been written by the write head using the bootstrap patterns for track following, additional servo write assist patterns can be written by the write head by track following on this initial set. The servo write assist patterns comply with the planarization constraints. See, for example: U.S. patent application Ser. No. 12/800,300 FIGS. 4 and 5; and the '581 FIG. 3.

The manufacture of patterned magnetic disks manufacture involves the creation of a small number of master templates. The master templates are used to create other templates and in the end possibly hundreds of millions of individual patterned magnetic disks. The creation of master templates is expensive and time-consuming, sometimes involving an electron beam etching step. Most of the magnetic disks that are incorporated into disk drive systems are double sided and store data on a front and back of the magnetic disk. If a single master template can be used for both front and back, fewer master templates are needed with resulting cost and time savings. U.S. Pat. No. 7,466,506 ("the '506"), incorporated herein by reference, provides a design for a single master template that can be used on both the front and back of a magnetic disk. Use of a single master template, however, poses a design difficulty because the second side of the magnetic disk is read in the reverse direction compared to the first side. Thus any servo pattern used on both sides of the magnetic disk will need to be capable of both a left-to-right and right-to-left read back. The '506 proposes several workarounds for this challenge including the servo pattern design of FIG. 7. The '506 FIG. 7 design complies with planarization constraints and is mirror symmetric so it can be read back in both the forward and reverse direction (enabling use of a single master template). The '506 FIG. 7 design, however, provides very few bits of track-ID in each individual servo pattern with the result that many servo patterns have to be read back to acquire the complete track-ID. Accordingly, there exists a need to provide a robust servo pattern that both complies with planarization constraints and includes a mirror symmetric servo pattern that enables use of a single master template.

SUMMARY

Embodiments described herein provide for robust servo patterns that comply with planarization constraints and also allow use of a single master template for manufacture of both the front and back of a magnetic disk. Planarization constraints are met because only a portion of servo data is hard patterned on the magnetic disk and the hard patterned servo data areas comply with planarization constraints. The servo pattern has two symmetrical servo write assist patterns, one on each side of a central burst pattern. The servo sync, SAM, track-ID, sector-ID, and/or RRO values can be written magnetically by the write head onto these servo write assist patterns after the completion of the planarization process. The symmetric design of the servo pattern allows both a left-to-right and a right-to-left servo write and read back, thereby enabling use of a single master template in magnetic disk manufacture.

For clarity in this specification, the word "pattern" is meant to describe the patterned media design of magnetic islands, non-magnetic grooves. "Data" is meant to describe the values and fields which are magnetically written on the patterns. The first column of Table 1 below has the terms that describe portions of the magnetic disk media pattern. The second column of Table 1 below has the terms that describe types of magnetically written servo data such as servo syncs, SAMs, track-IDs, sector-IDs, servo bursts, RRO values, and pads. Magnetic writing on the disk can be accomplished by bulk DC magnetization of all patterns on the magnetic disk or by a spin-stand writer, however the track-ID and servo-ID are typically written with the write head of an assembled disk drive system.

TABLE 1

Terms used for the patterns and servo data located in the servo sector

| PATTERN | DATA |
|---|---|
| patterned | magnetically written |
| servo pattern | servo data |
| central burst pattern | servo burst |
| sub-pattern | |
| (first, second, third, fourth; center, if three) | |
| checkerboard sub-pattern | checkerboard servo bursts (can be DC-free null servo bursts) |
| ABCD pattern | ABCD servo burst |
| phase burst pattern | phase servo burst |
| servo write assist pattern | |
| (a portion of the servo write assist pattern) | servo sync |
| (a portion of the servo write assist pattern) | track-ID |
| (a portion of the servo write assist pattern) | sector-ID |
| (a portion of the servo write assist pattern) | RRO value |
| (a portion of the servo write assist pattern) | pad |
| SAM pattern | SAM |
| (can be non-uniform; a portion of the servo write assist pattern) | |

In one embodiment, each side of the double-sided magnetic disk includes a plurality of data regions, each having a plurality of data patterns. The magnetic islands of the data patterns are separated by first non-magnetic grooves (with crossing grooves as well in BPM disks) and a plurality of servo patterns physically patterned at a plurality of locations in the magnetic disk. Each of the servo patterns comprises a first servo write assist pattern, a central burst pattern bordering the first servo write assist pattern, and a second servo write assist pattern bordering the central burst pattern. The first and second servo write assist patterns are symmetrical to each other about the central burst pattern. Servo data can be magnetically written on the first and/or second servo write assist patterns.

The first and second servo write assist patterns are comprised of magnetic islands and non-magnetic grooves. A servo write assist pattern can have radial magnetic columns and radial non-magnetic grooves. A servo write assist pattern can also have circumferential magnetic rows and circumferential non-magnetic grooves. A servo write assist pattern can also have magnetic islands surrounded by non-magnetic areas, such as in BPM.

If the servo sectors are zoned (zoned servo), the servo sectors may be discontinuous and broken into a plurality of separate servo zones. Zoned servo allows for a more uniform dimension of the radial magnetic columns and radial non-magnetic grooves as the servo sectors propagate from inner diameter to outer diameter. If the servo sectors are not zoned, the radial magnetic columns and radial non-magnetic grooves may propagate in a continuous or unbroken form from inner diameter to outer diameter. If the servo sectors are not zoned, the magnetic columns and non-magnetic grooves will be narrower near the inner diameter and wider near the outer diameter.

A single master template can be used for the eventual imprinting of each side of the double-sided disk. The master template is typically used to create additional template copies that are in turn used in the actual manufacturing process that creates production magnetic disks. If the servo pattern is symmetric, the production magnetic disks' servo data can be written in opposite directions. The front side of a magnetic disk, for instance, can be written to and read back in a clockwise direction (from left to right) while the back side can be written to and read back in a counterclockwise direction (from right to left).

The central burst pattern is operable to provide a position error signal when read by a read head of a disk drive system. The central burst pattern may include first and second sub-patterns that are substantially symmetrical to each other and radially offset to each other. The central burst pattern may also include third and fourth sub-patterns that are substantially symmetrical to each other and radially offset to each other. Alternatively, the central burst pattern includes three sub-patterns bordering one another, wherein the outer two sub-patterns are substantially symmetrical about the center sub-pattern. Generally, the sub-patterns of the central burst pattern have magnetic islands of a uniform size. In the preferred embodiment, the central burst pattern is two or more checkerboard sub-patterns that are radially offset from each other; these checkerboard sub-patterns can be magnetically written with a DC-free null servo burst.

The servo patterns may be configured in generally arcuate sector sectors or generally radially straight servo sectors. Each side of the magnetic disk can comprise a uniform polarity of magnetization before servo data is written magnetically by the write head. This uniform polarity of magnetization may be established with an immersion of the magnetic disk into a DC magnetic field. This uniform polarity of magnetization may also be established by a write head (either in an assembled disk drive system or on a spin stand writer) writing a constant magnetic polarity on each track.

The features of the magnetic disk allow the magnetic disk to be planarized with a dry planarization method. In this regard, the servo patterns may be comprised of magnetic columns of a first uniform width that is the same or similar to the uniform width of the non-magnetic grooves. In another embodiment, a portion of the magnetic columns in the servo write assist patterns have a first uniform width that differs from widths of the remaining portion of the magnetic columns in the servo write assist patterns, although they remain symmetrically patterned about the central burst pattern. Such may be used to pattern a SAM pattern within the servo write assist pattern. Generally, each of the first and second servo write assist patterns can be circumferentially longer than the central burst pattern.

In another embodiment, a magnetic disk includes a plurality of data regions (each having a plurality of data patterns) and servo patterns arranged in servo sectors operable to sector the data regions. Each of the plurality of servo patterns comprises a first servo write assist pattern, a central burst pattern bordering the first servo write assist pattern, and a second servo write assist pattern bordering the central burst pattern. The first and second servo write assist patterns are symmetrical to each other about the central burst pattern. Each of the first and second servo write assist patterns comprises at least three magnetic columns separated by non-magnetic grooves. The magnetic columns and the non-magnetic grooves extend in a radial direction from an inner diameter towards an outer diameter.

Various forms of other servo data may be written into the first and second servo write assist patterns. The first servo write assist pattern may include a magnetically written servo sync, a SAM, a track-ID, a sector-ID, and/or RRO values. The second servo write assist pattern may either: (i) maintain a uniform polarity of magnetization after servo data writing and contain no servo data; or (ii) include portions of the track-ID, sector-ID, and/or RRO values. Generally, only one of the servo write assist patterns comprises a magnetically written servo sync.

The increasing track density in disk drive systems has resulted in a large number of tracks and increasingly large track-IDs. To reduce the size of each servo sector, the track-ID and/or sector-ID can be split up between multiple servo sectors rather than record the full track-ID and/or sector-ID in a each servo sector. As such, the first servo write assist pattern of a single servo pattern may comprise the entire track-ID and/or the entire sector-ID. Alternatively, the first and second servo write assist patterns together of a single servo pattern may include a magnetically written track-ID and/or a magnetically written sector-ID. In another embodiment, portions of a track-ID and/or a sector-ID are magnetically written into a plurality of servo patterns (e.g., each first servo write assist pattern of a servo pattern within each sector may include a portion of the track-ID and/or sector-ID).

DESCRIPTION OF THE DRAWINGS

Some embodiments of the present invention are now described, by way of example only and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
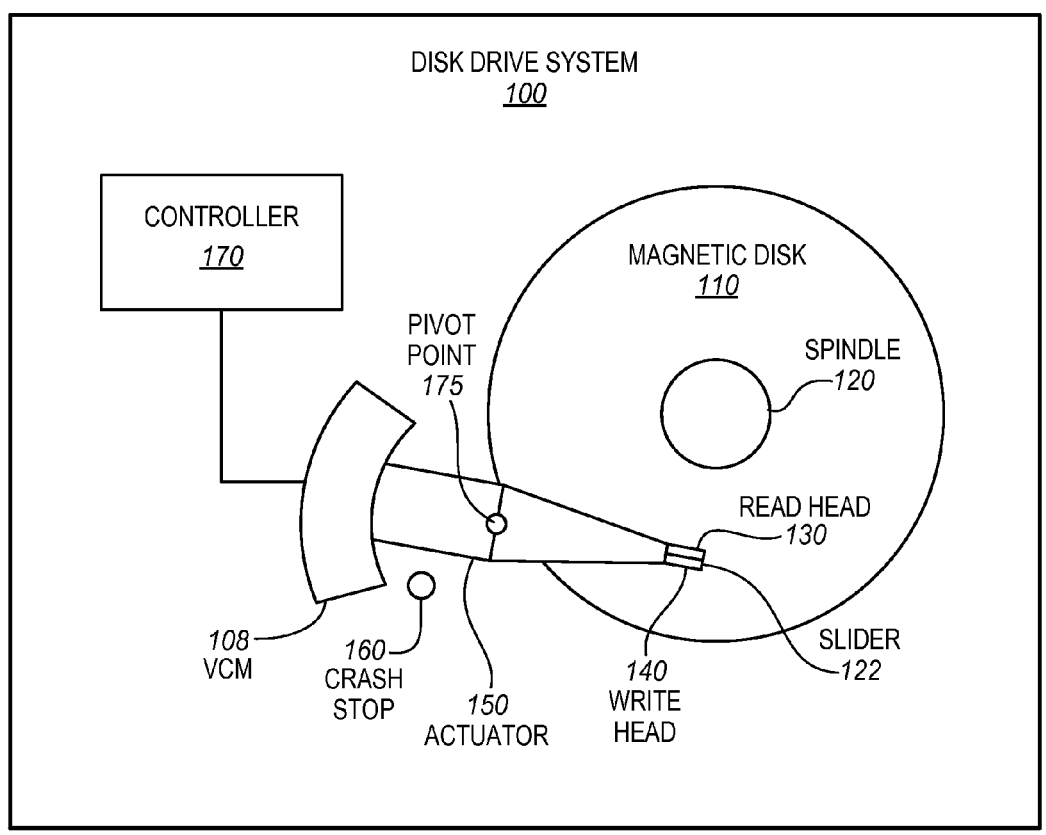
FIG. 1 illustrates a disk drive system.

FIG. 1 illustrates a simplified overhead view of a typical disk drive system 100, which is suitable to include a magnetic disk 110, as exemplarily described herein. In the disk drive system 100, the magnetic disk 110 is rotatably mounted upon a motorized spindle 120. A slider 122, having a read head 130 and a write head 140 fabricated thereon, is mounted upon an actuator 150 to "fly" above the surface of the rotating magnetic disk 110. The disk drive system 100 may also include a controller 170 that controls and drives a positional voltage to a VCM 108 to control the position of the actuator 150. The disk drive system 100 may also include an inner diameter crash stop 160 to hold the read head 130 and the write head 140 still at a fixed radius relative to the center of the magnetic disk 110. For example, the actuator 150 pivots about the pivot point 175 against the crash stop 160 to prevent the read head 130 and the write head 140 from traveling past a certain point at the inner diameter. The disk drive system 100 may include other components (e.g., a spindle motor used to rotate the magnetic disk 110) that are not shown for the sake of brevity. Additionally, certain components within the disk drive system 100 may be implemented as hardware, software, firmware, or various combinations thereof.

In conventional servo writing, a circular track pattern is created by pushing the actuator 150 of the disk drive system 100 against the crash stop 160 and then writing a single track pattern or a group of concentric track patterns at increasing radii. Once enough concentric tracks have been written, the read head 130 may sense previously written servo data and allow propagation of new servo tracks (e.g., both servo bursts and track-ID) across the surface of the magnetic disk 110. That is, the read head 130 may track follow over previously written servo data while the offset write head 140 is used to write new servo data over tracks that have not yet been servo written.

With the advent of patterned media, servo writing is presented with new challenges. For example, track trajectory is generally not concentric with the center of rotation of the spindle 120 because it is difficult if not impossible to concentrically align data patterns with the spindle 120.

Figure 2:
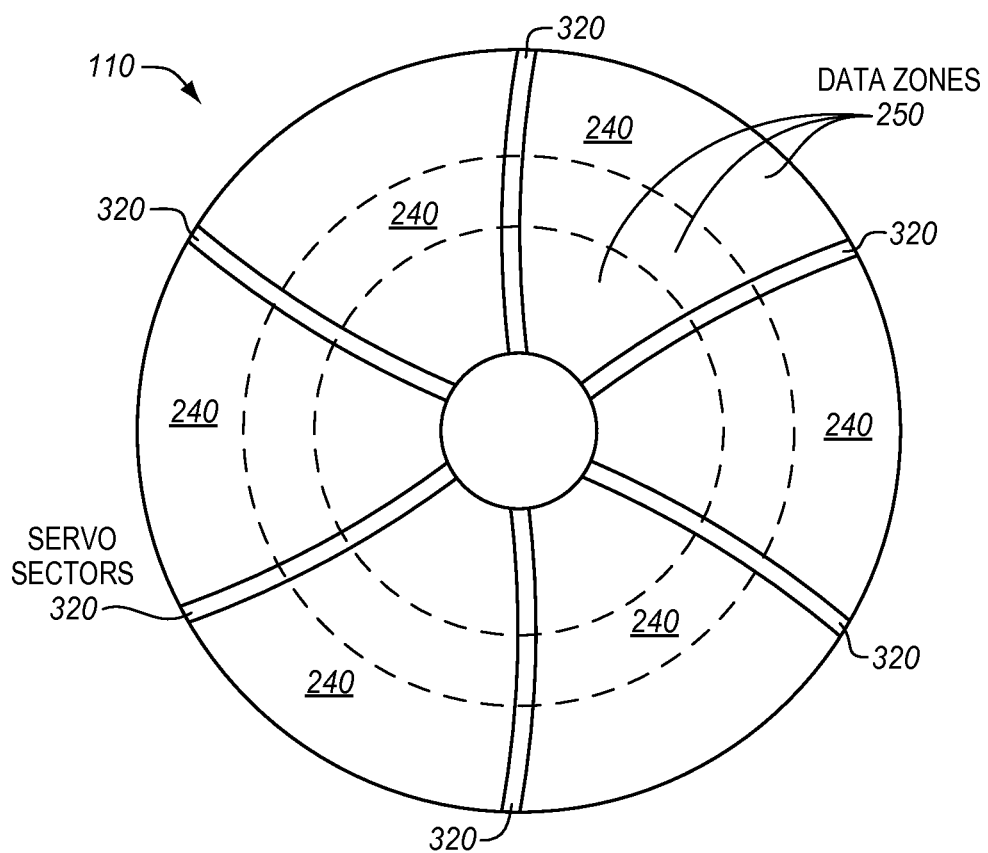
FIG. 2 illustrates a magnetic disk in an exemplary embodiment with an plurality of generally arcuate servo patterns.
Figure 3:
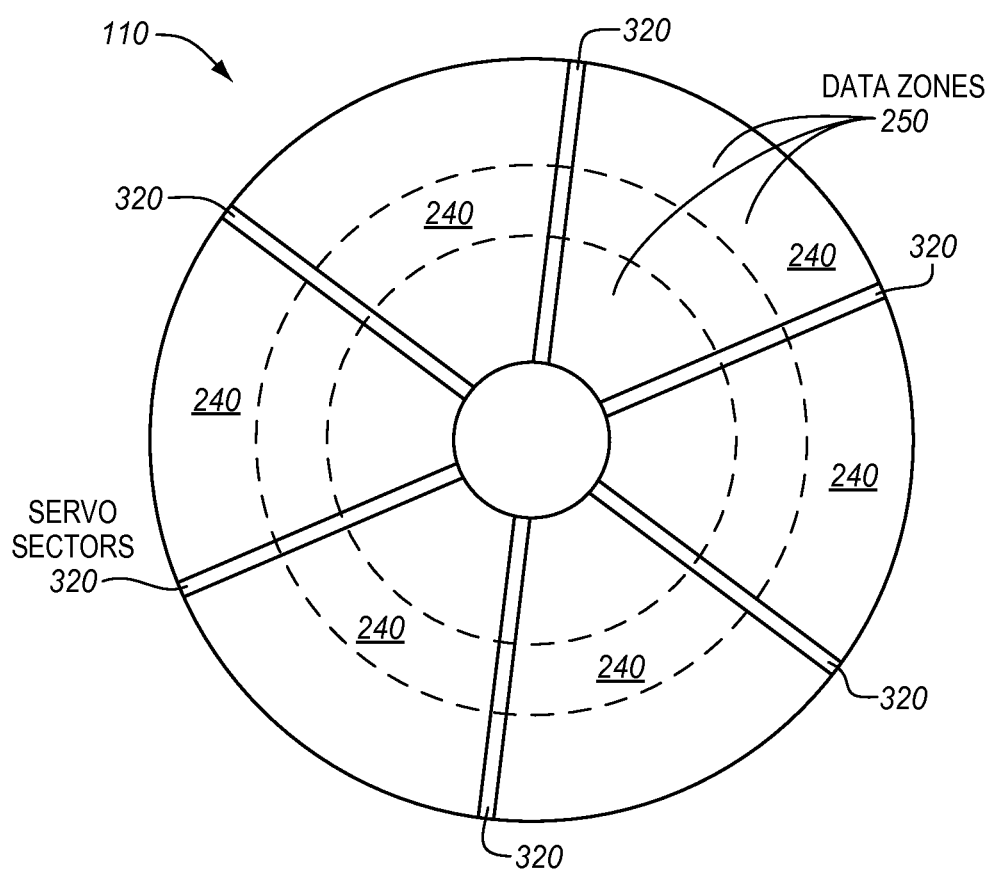
FIG. 3 illustrates a magnetic disk in an exemplary embodiment with a plurality of generally straight servo patterns.

The magnetic disk 110 may be double-sided with each side being configured with a plurality of servo patterns and data patterns. The dimensions of the data patterns and the servo patterns are compatible with the above-mentioned planarization techniques. The servo patterns are also symmetrically patterned within the servo sectors such that a first read head 130 reading magnetically written servo data from one side of the magnetic disk 110 may read substantially identical magnetically written servo data from a second read head 130 reading from the other side of the magnetic disk 110. Thus, the servo patterns (and the data patterns) of both sides may be imprinted from a single master template. The servo patterns may be generally arcuate or generally straight in a radial direction from the inner diameter to the outer diameter. FIG. 2 illustrates one example of the magnetic disk 110 with generally arcuate servo sectors 320. FIG. 3 illustrates one example of the magnetic disk 110 with generally straight radial servo sectors 320.

As can be seen in FIGS. 2 and 3, the data regions 240 of the magnetic disk 110 are separated by the servo sectors 320. The data regions 240 each include a plurality of concentric data zones 250 that are pre-patterned with magnetic islands and non-magnetic grooves (shown in greater detail below). Generally, the magnetic islands are configured to have comparable widths, as are the non-magnetic grooves to meet the various planarization constraints described above. However, the magnetic islands and the non-magnetic grooves are not intended to be limited to any particular dimension.

Before discussing particular servo patterns, it should be noted that, in each of the data regions 240, data zones 250 may have a fixed data frequency that can be adjusted so that the frequency approximately scales with increasing radius and the linear density is approximately constant across all data zones 250. Each data zone 250 includes multiple concentric data patterns with each track being divided into multiple circumferential sectors (e.g., each data region 240 is separated by servo sectors 320). Each servo sector 320 has, after servo writing, magnetically written servo data. The servo patterns, as exemplarily illustrated in FIG. 4, also comply with the various planarization constraints described above to utilize the advantages associated with patterned magnetic disk.

Figure 4:
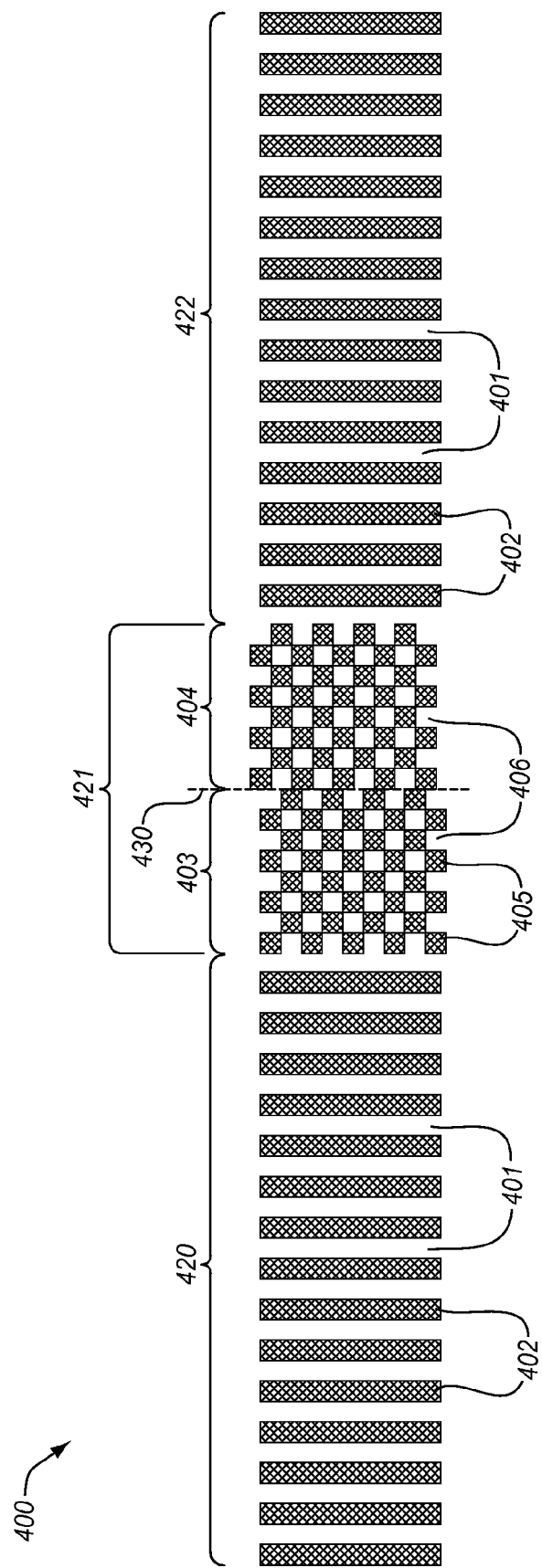
FIG. 4 illustrates a symmetrical servo pattern of the magnetic disk in an exemplary embodiment with two sub-patterns in the central burst pattern.

FIG. 4 illustrates a symmetrical servo pattern 400 imprinted within the servo sectors 320 of the magnetic disk 110 in an exemplary embodiment. More specifically, the symmetrical servo pattern 400 may be physically patterned in the servo sectors 320 of the magnetic disk 110 in three distinct sections: a first servo write assist pattern 420, a central burst pattern 421, and a second servo write assist pattern 422. The servo write assist patterns 420 and 422 are symmetrically patterned about the central burst pattern 421 and comprise the same number of radial magnetic columns 402 and radial non-magnetic grooves 401. The term radial with respect to the magnetic columns 402 and the non-magnetic grooves 401 is intended to designate an orientation of the columns 402 and grooves 401 from the inner diameter to the outer diameter. Generally, there are at least three radial magnetic columns 402 within each servo write assist pattern 420/422. While the dimensions of the radial magnetic columns 402 and the non-magnetic grooves 401 may vary within a particular servo write assist pattern, the magnetic columns 402 and non-magnetic grooves 401 are mirror symmetric about the central burst pattern 421 such that the servo write assist patterns 420 and 422 may be read in the same manner regardless of direction (e.g., from left-to-right and right-to-left). Such is advantageous due to the ability to imprint both sides of the magnetic disk 110 with a single master template, as mentioned above.

The central burst pattern 421 within the servo pattern 400 is substantially symmetrical. For example, the central burst pattern 421 may include two sub-pattern 403 and 404 each comprising about the same size and number of magnetic islands 405. That is, the two sub-patterns 403 and 404 are essentially the same and somewhat symmetrical about the center line 430 within the central burst pattern 421. The magnetic islands 405 are comparable in size and shape to the non-magnetic "valleys" 406 and may be further comparable to sizes and shapes of "bits" in the data regions 240 of a bit patterned magnetic disk embodiment. As used herein, the term valley 406 is merely intended to describe the non-magnetic portions of the magnetic disk 110 that have been patterned into the magnetic disk 110, similar to the non-magnetic grooves 401. The two sub-patterns 403 and 404 are usually radially offset with respect to one another by a fraction of the magnetic island radial length (e.g., a radial offset length of one fourth of a track width, one third, one half, or other fraction of a magnetic island radial length).

Figure 5:
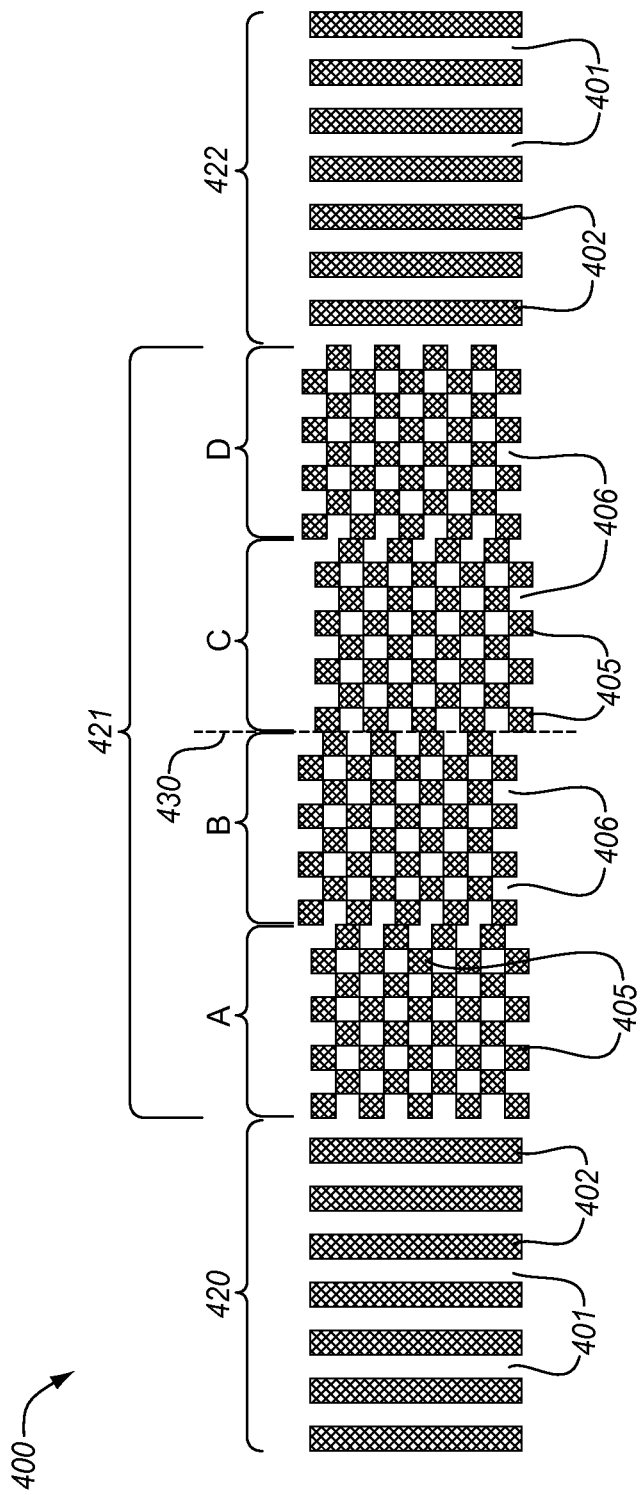
FIG. 5 illustrates another symmetrical servo pattern of the magnetic disk in an exemplary embodiment with four sub-patterns in the central burst pattern.

In this embodiment, the central burst pattern 421 can be magnetically written with alternating polarity to create a null servo burst configured upon the two sub-patterns 403 and 404. However, the invention is not intended be limited to the exemplary embodiment as other types of servo bursts may be employed. As illustrated in FIG. 5, the central burst pattern could include four checkerboard sub-patterns, two sub-patterns patterned to the left of the center line 430 and two sub-patterns patterned to the right of the center line 430. (See the '506 for ABCD patterns). Alternatively, the central burst pattern 421 may be configured with three sub-patterns with a first sub-pattern patterned to the left of the center line 430, a second sub-pattern patterned to the right of the center line 430, and a third sub-pattern patterned between the first and the second sub-pattern (e.g., straddling the center line 430). In any case, the central burst pattern is substantially symmetrical about the center line 430 with radial offset between the sub-patterns.

Once the servo patterns 400 are imprinted on the magnetic disk 110 (e.g., in the servo sectors 320), the magnetic disk 110 may be immersed in a DC field to establish a uniform polarity of magnetization. When read back, the uniform polarization shows contrast between the magnetic portions of the disk 110 and the non-magnetic portions. A write head 140 may be used to DC magnetize the magnetic portions of the disk 110.

Figure 6:
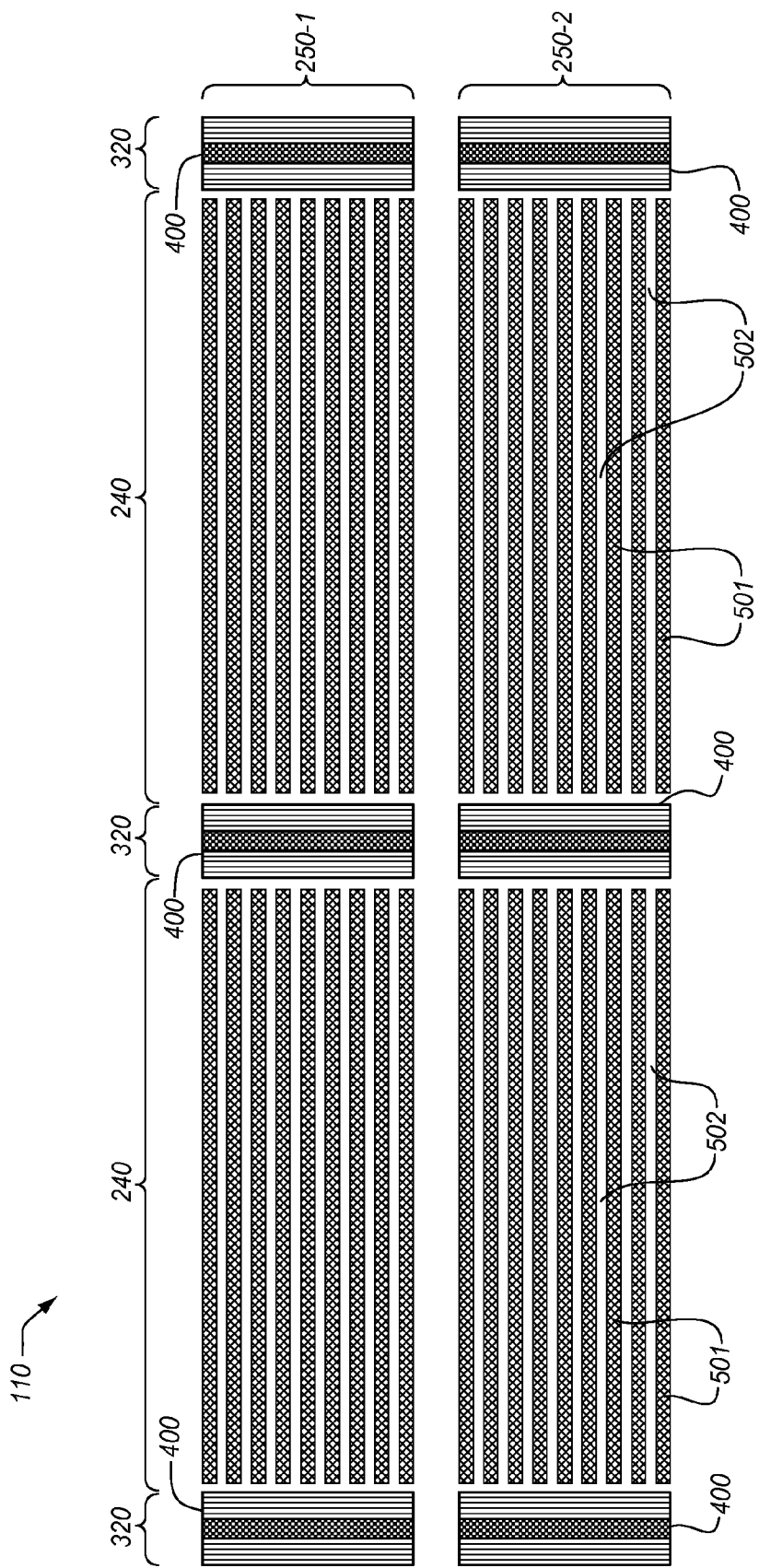
FIG. 6 illustrates servo patterns sectoring data regions in an exemplary embodiment.

FIG. 6 illustrates how the servo patterns 400 are configured within the servo sectors 320 of the magnetic disk 110 in an exemplary embodiment. As demonstrated above, the magnetic disk 110 is separated into a plurality of data regions via the servo sectors 320. The magnetic disk 110 is also configured into a plurality of concentric data zones 250 (e.g., data zones 250-1 and 250-2). Each data zone 250 of the magnetic disk 110 is patterned with a plurality of data patterns 501 (either DTM or BPM) separated by a plurality of non-magnetic grooves 502 with each data pattern 501 being operable to record data on the magnetic disk 110.

Figure 7:
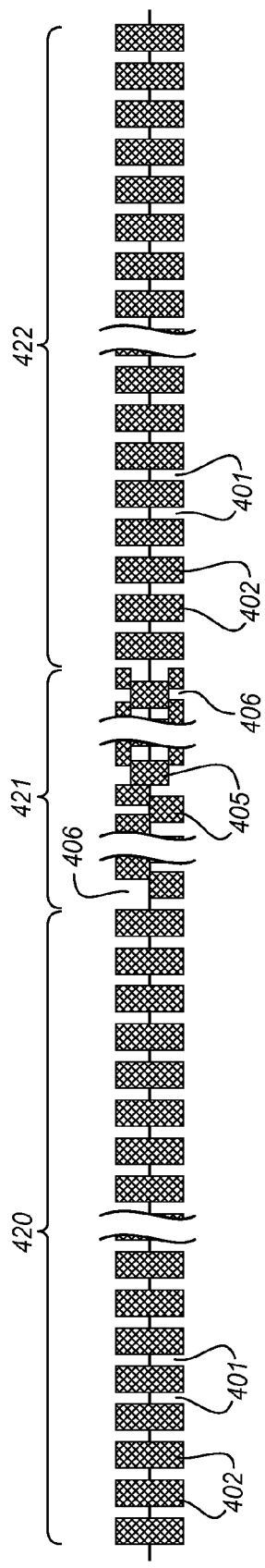
FIG. 7 illustrates a more detailed track view of the imprinted servo pattern after DC magnetization of the magnetic disk in an exemplary embodiment.
Figure 8:
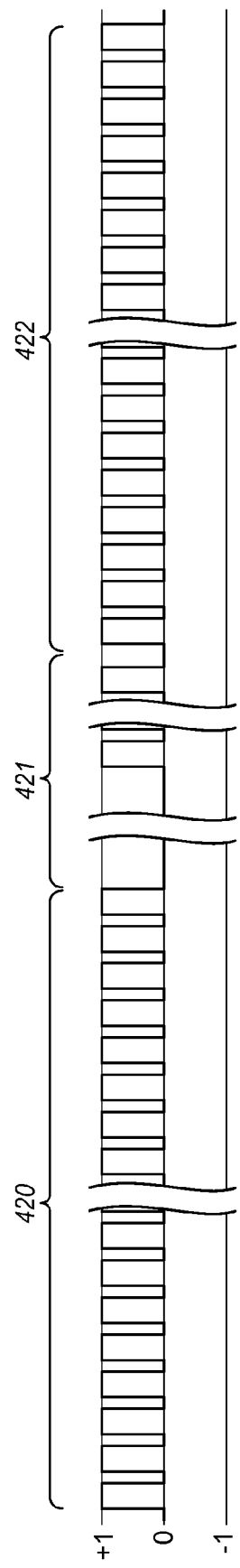
FIG. 8 illustrates a read signal from the imprinted servo pattern of FIG. 7 in an exemplary embodiment.

FIGS. 7 and 8 illustrate a "track view" of the imprinted servo pattern 400 after DC magnetization of the magnetic disk 110 in an exemplary embodiment. For example, FIG. 7 illustrates a DC magnetized track within the servo pattern 400 as read by the read head 130 whereas FIG. 8 illustrates the signal generated by the read head 130 passing over that track. The magnetic portions of the servo pattern 400 (e.g., magnetic columns 402 and magnetic islands 405) are uniformly polarized in this example. Thus, a read signal may be generated based on the DC magnetization of the magnetic portions contrasting with the non-magnetic portions of the servo pattern 400 (e.g., the radial non-magnetic grooves 401 and non-magnetic valleys 406).

The uniform polarity of magnetization of the servo patterns 400 forms "simple servo data" that can also help establish frequency and determine track eccentricity so as to facilitate servo data writing in the servo patterns. For example, the data patterns 501 are not likely to be concentric with the rotation axis of the spindle 120, because the magnetic disks are mounted with a finite centering tolerance on the spindle 120. The central burst patterns 421 of the servo patterns 400 (or bootstrap patterns) may be used by the controller 170 to compute a position error signal ("PES") to compensate for eccentricity in the magnetic disk 110. Once the eccentricity in the magnetic disk 110 is compensated, servo data may be written in the servo write assist patterns 420 and 422 of the servo sectors 320 on a track by track basis.

As discussed above, when the magnetic disk 110 is manufactured, the servo patterns 400 generally have no recorded data to identify the individual tracks and sectors. This information may be magnetically recorded during the servo data writing using the write head. During the servo writing process, the controller 170 may direct the write head 140 to write the track-ID and sector-ID in a first servo write assist pattern 420 and/or a second servo write assist pattern 422 by track following on previously written servo data. Note that with the RWO, the read head may be closer to the inner diameter than the write head, allowing the servo data to be propagated from the inner diameter to the outer diameter.

It should be noted that track-ID and/or sector-ID may be written to the servo patterns in a variety of layouts. For example, the track-ID and sector-ID may be split between a plurality of servo patterns so as to conserve magnetic disk real estate for data. That is, if the entire track-ID number is written in each of the servo patterns, the track-ID may occupy a larger number of bits (taking away real estate that could instead be used for the recording of data). Thus, information pertaining to partial track-IDs may be split between several servo sectors. The invention is not intended to be limited to recording these track-IDs across servo patterns; complete track-IDs may be written in each individual servo pattern. In one embodiment, sector-IDs comprise a "start-of-track" in one servo pattern along with a SAM within each of the servo pattern (e.g., wherein the controller 170 keeps a running count of the sector-ID after each SAM is read).

As mentioned above, the servo pattern 400 has mirror symmetry with the servo write assist patterns 420 and 422 and is substantial symmetrical about the central burst pattern 421. Accordingly, the servo patterns on first side of the magnetic disk 110 may be read in a clockwise direction with a first read head 130 while the same pattern can be read in a counter-clockwise direction with a second read head 130 on the second side of the magnetic disk 110.

In one embodiment, the write head 140 writes a servo burst, SAM, track-ID, and sector-ID, from left-to-right (e.g., in a clockwise direction) in a first servo write assist pattern 420 while leaving the second servo write assist pattern 422 in a uniform polarity of magnetization. In corresponding fashion, the write head 140 writes the servo burst, SAM, track-ID, and sector-ID, from right-to-left, in a second servo write assist pattern 422 on the other side of the magnetic disk 110 while leaving the first servo write assist pattern 420 in a uniform polarity of magnetization.

In another embodiment, servo sync and SAM are written to the first servo write assist patterns 420 while the track-ID and the sector-ID are written to the second servo write assist patterns 422. Such may reduce the amount of lost real estate on the magnetic disk 110 (e.g, by allowing each servo write assist pattern to be shorter in circumferential length). Alternatively, the track-ID may be split into two or more separate portions with a first portion of the track-ID being written to the first servo write assist pattern 420 and a second portion being written into the second servo write assist pattern 422.

In another embodiment, the second servo write assist pattern 422 may include an RRO value. The RRO value is used by the controller 170 of the disk drive system 100 to apply a feedforward compensation to the actuator 150 to better follow an individual data track.

Figure 9:
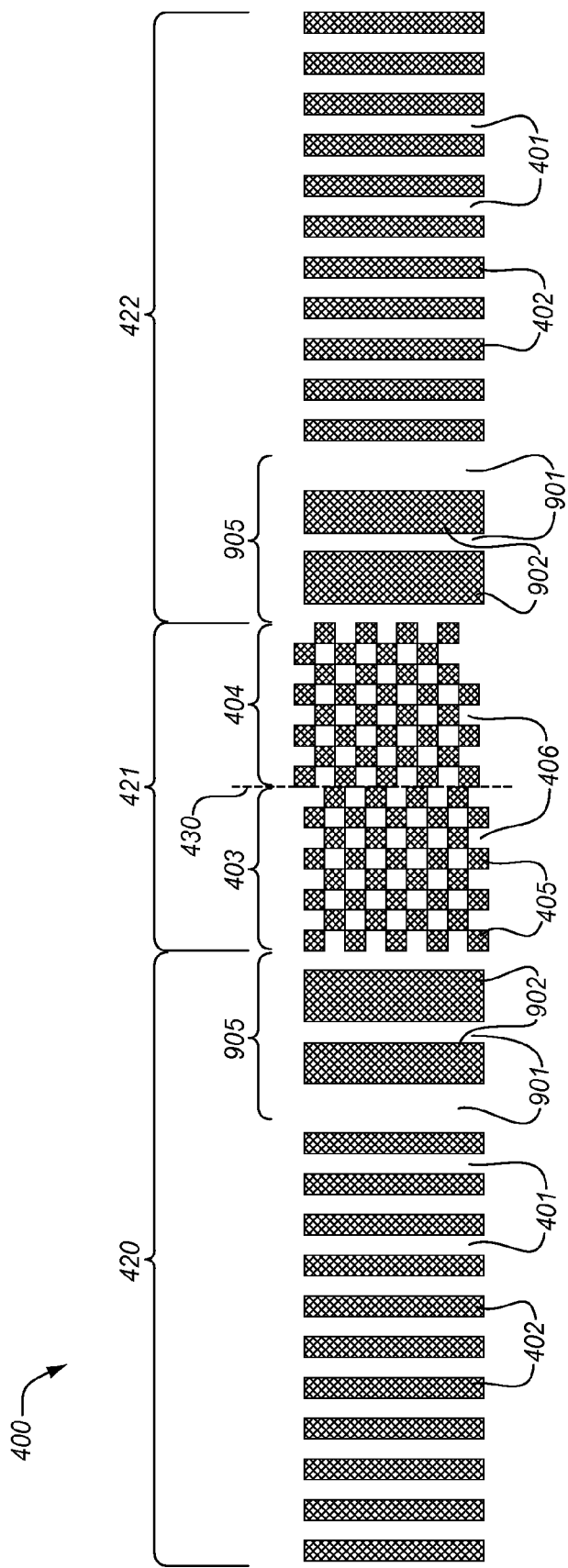
FIG. 9 illustrates a servo pattern with symmetrical SAM patterns in an exemplary embodiment.

Although shown and described with respect to a particular physical patterning and magnetic writing of the servo patterns 400, the invention is not intended to be so limited as the servo patterns 400 may be servo written and/or configured in other ways. For example, the magnetic islands 405 of the central burst pattern 421 may be written with alternating polarity. In one embodiment, the SAM pattern has a different shape and/or size from the radial magnetic columns 402 and/or non-magnetic grooves 401 of the servo write assist patterns 420 and 422. For example, a SAM pattern may be designated within the first servo write assist pattern 420 with radial columns that differ in width and/or spacing from the other radial columns 402 in the first servo write assist pattern 420. To maintain the mirror symmetry, the second servo write assist pattern 422 would then be configured with an substantially identical, albeit mirror symmetrical, SAM pattern, regardless of whether the SAM pattern in the second servo write assist pattern 422 is written to. An example of such is illustrated in FIG. 9. In the FIG. 9 embodiment, a SAM pattern 905 is defined in each of the servo write assist patterns 420 and 422 having radial magnetic columns 902 and radial non-magnetic grooves 901 that differ in size from the magnetic columns 402 and the non-magnetic grooves 401. The SAM is often at the end of the servo sync, so in FIG. 9 the first servo pattern would likely include a servo sync and the SAM and the second servo pattern would likely include the track-ID and servo-ID. The SAM pattern can also be placed near the middle of the servo write assist patterns, such that a single servo write assist pattern can have the servo sync, SAM, and at least a portion of the track-ID or sector-ID.

The servo data can be written to the magnetic disk in the manufacturing facility by first patterning both a first and second side of a magnetic disk and then writing servo data into these patterns. In a preferred embodiment, the master template will be the same for both a first side and second side of the magnetic disk. The magnetic disk 110 can be DC magnetized by bulk DC magnetization (e.g., single magnetic polarization). The magnetic disk can also be DC magnetized with use of the write head in an assembled disk drive system. Track-ID and servo-ID can be magnetically written in the servo write assist patterns using the write head for each side of the magnetic disk. The magnetic disk is only rotated in one direction. For instance, a first side of the magnetic disk may be written clockwise while the second side of the magnetic disk may be written counterclockwise. Because of the different directions, the servo data is written in opposite directions on the first side's servo write assist patterns in comparison to the second side's servo write assist patterns. The first encountered of the two servo write assist patterns can have the servo sync and SAM magnetically written. The second encountered of the two servo write assist patterns can have other servo data (such as additional track-ID bits and/or RRO values) or can be left empty. If the front side of the magnetic disk is read in a clockwise direction and the back side is read in a counter-clockwise direction then: (i) the servo patterns on this front side will be written and read back from left-to-right and the first encountered servo pattern will be on the left of the central burst pattern, the second encountered servo pattern will be on the right of the central burst pattern; and (ii) the servo patterns on this back side will be written and read back from right-to-left and the first encountered servo pattern will be on the right of the central burst pattern, the second encountered servo pattern will be on the left of the central burst pattern. The complete track-ID and sector-ID can be magnetically written in either the first encountered and/or second encountered servo patterns. The track-IDs and/or sector-IDs can also be split between multiple servo patterns. An alternating polarity can be written in checkerboard sub-patterns to create a DC-free null servo burst.

Although specific embodiments were described herein, the scope of the invention is not limited to those specific embodiments. The scope of the invention is defined by the following claims and any equivalents thereof.

We claim:

1. A magnetic disk, comprising:
 a plurality of servo patterns, each servo pattern comprising a first servo write assist pattern, a central burst pattern bordering the first servo write assist pattern, and a second servo write assist pattern bordering the central burst pattern,
 wherein the first and second servo write assist patterns are substantially symmetrical to each other about the central burst pattern, and
 wherein each servo pattern comprises a magnetically written servo sync with at least four magnetic transitions.

2. The magnetic disk of claim 1, wherein the servo sync of each servo pattern is magnetically written with alternating polarity.

3. The magnetic disk of claim 1, wherein the servo sync of each servo pattern is magnetically written with uniform polarity.

4. The magnetic disk of claim 1,
 wherein a plurality of sector address marks (SAMs) are magnetically written into the servo patterns, and
 wherein all the SAMs are substantially identical.

5. The magnetic disk of claim 1, wherein the servo patterns are arranged into servo sectors.

6. The magnetic disk of claim 5, wherein the servo sectors extend generally straight from an inner diameter of the magnetic disk to an outer diameter of the magnetic disk.

7. The magnetic disk of claim 5, wherein the servo sectors extend generally arcuately from an inner diameter of the magnetic disk to an outer diameter of the magnetic disk.

8. The magnetic disk of claim 5,
 wherein each servo pattern comprises a plurality of magnetically written sector-IDs, and
 wherein the sector-IDs within each servo sector are substantially identical within that servo sector.

9. The magnetic disk of claim 5, wherein a plurality of magnetically written start-of-track marks are written within one servo sector.

10. The magnetic disk of claim 1, wherein at least a portion of a track-ID is magnetically written in each first servo write assist pattern.

11. The magnetic disk of claim 1, wherein at least a portion of a track-ID is magnetically written in each second servo write assist pattern.

12. The magnetic disk of claim 1,
 wherein at least a first portion of a track-ID is magnetically written in each first servo write assist pattern; and
 wherein at least a second portion of a track-ID is magnetically written in each second servo write assist pattern.

13. The magnetic disk of claim 1, wherein at least a portion of a sector-ID is magnetically written in each first servo write assist pattern.

14. The magnetic disk of claim 1, wherein at least a portion of a sector-ID is magnetically written in each second servo write assist pattern.

15. The magnetic disk of claim 1, wherein the central burst pattern comprises a magnetically written uniform polarity field.

16. The magnetic disk of claim 1, wherein the central burst pattern comprises a magnetically written alternating polarity field.

17. The magnetic disk of claim 1, wherein the central burst pattern comprises a magnetically written DC-free null servo burst.

18. The magnetic disk of claim 1, wherein each of the first and second servo write assist patterns comprises circumferential magnetic rows and circumferential non-magnetic grooves.

19. The magnetic disk of claim 1, wherein each of the first and second servo write assist patterns comprises at least three radial magnetic columns separated by radial non-magnetic grooves.

20. The magnetic disk of claim 1, wherein the central burst pattern comprises a plurality of checkerboard sub-patterns.

21. The magnetic disk of claim 1, wherein the central burst pattern comprises an ABCD pattern.

22. The magnetic disk of claim 1, wherein the central burst pattern comprises a phase pattern.

23. The magnetic disk of claim 1, wherein the second servo write assist pattern comprises a magnetically written uniform polarity field.

24. The magnetic disk of claim 1, wherein the second servo write assist pattern of each servo pattern comprises a plurality of magnetically written repeatable runout values.

25. A method of writing servo data comprising:
 (a) patterning both a first and second side of a double-sided magnetic disk with a plurality of substantially identical servo patterns, each servo pattern comprising two servo write assist patterns that are substantially symmetrical to each other about a central burst pattern;
 (b) assembling the double-sided magnetic disk into a disk drive system with a first side write head operable for writing on the first side and a second side write head operable for writing on the second side; and
 (c) rotating the double-sided magnetic disk in a single direction to write a plurality of servo syncs within:
  the first encountered of the two servo write assist patterns of each servo pattern on the first side using the first side write head; and
  the first encountered of the two servo write assist patterns of each servo pattern on the second side using the second side write head.

26. The method of claim 25, wherein the servo write assist patterns on the first side are written in a clockwise direction and the servo write assist patterns on the second side are written in a counterclockwise direction.

27. The method of claim 25, wherein a sector address mark (SAM) is written in the first encountered of the two servo write assist patterns of each servo pattern.

28. The method of claim 25, wherein at least a portion of a track-ID is written in the first encountered of the two servo write assist patterns of each servo pattern.

29. The method of claim 25, wherein at least a portion of a track-ID is written in the second encountered of the two servo write assist patterns of each servo pattern.

30. The method of claim 25, wherein at least a portion of a sector-ID is written in the first encountered of the two servo write assist patterns of each servo pattern.

31. The method of claim 25, wherein each central burst pattern is magnetically written with DC-free null servo burst.

\* \* \* \* \*